E. & C. MAGINN.
SHOW-BOXES.
No. 7,371. Reissued Oct. 31, 1876
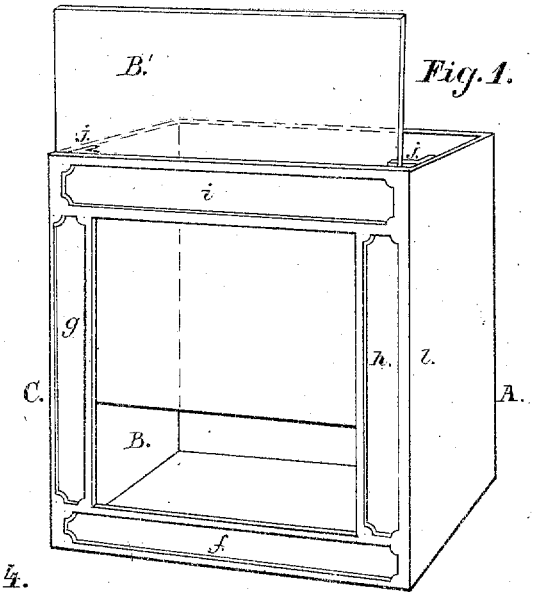
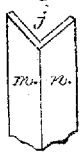
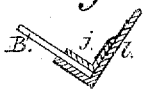
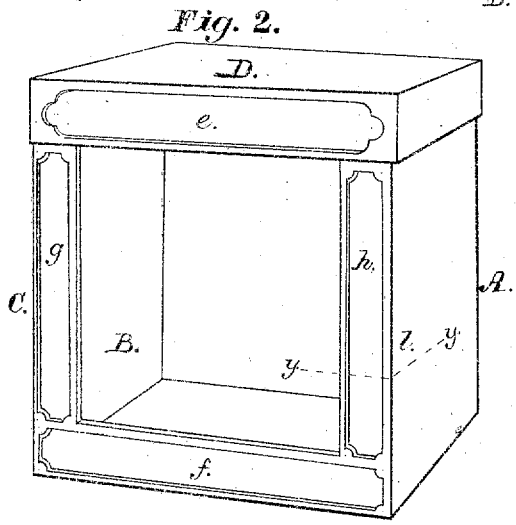
WITNESSES
J. M. McNeill
W. Bertrand Acker.
By
INVENTORS.
Edward and Charles Maginn
Parker & Sweet, Jr. & Co.
Attorneys.

UNITED STATES PATENT OFFICE.

EDWARD MAGINN AND CHARLES MAGINN, OF ALLEGHENY, PA.

IMPROVEMENT IN SHOW-BOXES.

Specification forming part of Letters Patent No. 176,974, dated May 2, 1876; reissue No. 7,371, dated October 31, 1876; application filed June 27, 1876.

*To all whom it may concern:*

Be it known that we, EDWARD MAGINN and CHARLES MAGINN, both of Allegheny, in the county of Allegheny and State of Pennsylvania, have invented a certain new article of manufacture—viz., a Paper Show-Box for Crackers, &c.; and we do hereby declare that the following is a full, clear, and exact description thereof, that will enable others skilled in the art to which it appertains to make and use the same, reference being had to the accompanying drawings and to the letters of reference marked thereon, which form a part of this specification.

The object of our invention is to furnish a receptacle for readily packing and displaying crackers, cakes, and other articles in one and the same package; and it consists of a paper show-box composed of a body and lid, constructed of that class of paper known as pasteboard, the body being provided with a glass front, surrounded by overlapping ornamental borders, all as will be hereinafter more fully described, and pointed out in the claims.

Referring to the drawings, Figure 1 is a perspective view of the body of the box, representing its glass panel partly removed. Fig. 2 is a perspective view of the body of the box and its lid. Fig. 3 is a transverse section of the box at line *y* of Fig. 2. Fig. 4 is a perspective view of one of the guides used for holding the glass panel in position.

Similar letters of reference indicate like parts in the several figures.

A represents the body of the box, which is constructed of pasteboard, having a square or other suitable-shaped opening, B, in one of its sides, forming a frame, C. The outside walls of the body of the box and its lid are covered with ornamental paper, and the frame C and the front edge of the lid D are furnished with panels, or representations of panels, *i f g h*, upon which names may be placed. On the inside of the box, near the inner wall of the frame C, are attached guides *j*, constructed of heavy pasteboard, which are formed by bending the paper at right angles, as represented in Fig. 4. These guides extend from the top edge of the box to its bottom, and are secured to the sides *k* and *l* of the box by pasting the part *m* to the side *k*, and the part *n* to the side *l*. The inner walls of the guides *j* are covered with a thinner paper than that of which the guides are constructed, and this thin paper extends beyond the parts *m* and *n* of the guides, and is pasted to the sides *k* and *l* of the box, thereby more permanently securing the attachment of the guides. These guides *j* are used for the purpose of holding the detachable glass plate closely against the inner wall of the frame C, as indicated in Fig. 3.

By having the glass panel B′ detachable, as hereinbefore described, it can be removed (as indicated in Fig. 1) with ease and facility, for the purpose of cleaning it, or for replacing it in case of breakage by accident.

Having thus described our invention, what we claim as new and useful is—

1. In a show-box for crackers, the transparent glass panel, held in position with relation to the front opening, substantially as and for the purpose described.

2. A pasteboard show-box for crackers and other articles, provided with a glass front held in position by the angular guides *j*, and the edges of the pasteboard frame which extend over upon the glass front, so as to form ornamental borders *i f g h*, substantially as and for the purpose described.

3. In a show-box for crackers or other articles, the panels, or representation of panels, *i f g h*, surrounding the glass front of the box, substantially as and for the purpose described.

4. In a show-box for crackers, the angular strips or guides *j*, for holding the glass panel in position with relation to the open front of the box, substantially as shown and described.

In testimony that we claim the foregoing, we have hereunto set our hands this 24th day of June, 1876.

EDWARD MAGINN.
CHARLES MAGINN.

Witnesses:
PARKER H. SWEET, Jr.,
B. McKENNA.